United States Patent [19]

Ishikawa

[11] Patent Number: 5,584,572
[45] Date of Patent: Dec. 17, 1996

[54] REFLECTOR USED IN A STROBE DEVICE

[75] Inventor: Tsuyoshi Ishikawa, Tokyo, Japan

[73] Assignee: Asahi Kogaku Kogyo Kabushiki Kaisha, Tokyo, Japan

[21] Appl. No.: 291,913

[22] Filed: Aug. 18, 1994

[30] Foreign Application Priority Data

Aug. 19, 1993 [JP] Japan .................. 5-226419

[51] Int. Cl.$^6$ .................................... F21V 7/12
[52] U.S. Cl. ............... 362/346; 362/18; 362/223; 362/256; 362/277; 362/297
[58] Field of Search ................ 362/16–18, 217, 362/223, 255, 256, 260, 297, 304, 305, 346, 349, 277, 319

[56] References Cited

U.S. PATENT DOCUMENTS

| | | | |
|---|---|---|---|
| 3,777,135 | 12/1973 | Rees | 362/225 |
| 4,141,059 | 2/1979 | Shiojiri | 362/319 |
| 4,295,186 | 10/1981 | Sugiura et al. | 362/217 |
| 4,322,779 | 3/1982 | Bohme et al. | 362/18 |
| 4,342,071 | 7/1982 | Chamberlain | 362/158 |
| 4,460,942 | 7/1984 | Pizzuti et al. | 362/223 |
| 4,750,096 | 6/1988 | Lim | 362/260 |
| 5,055,976 | 10/1991 | Arai | 362/17 |
| 5,160,192 | 11/1992 | Sugawara | 362/16 |

FOREIGN PATENT DOCUMENTS

3-48835  3/1991  Japan .

Primary Examiner—Stephen F. Husar
Assistant Examiner—Alan B. Cariaso
Attorney, Agent, or Firm—Greenblum & Bernstein, P.L.C.

[57] ABSTRACT

A reflector used in a strobe device has a rounded reflecting portion, a first pair of planar reflecting portions and a second pair of planar reflecting portions. A shape of the rounded reflecting portion is defined by a portion of a cylinder and by the rounded reflecting portion contacting a portion of an outer surface of a light source used in the strobe device. The first pair of planar reflecting portions is connected to the rounded reflecting portion, such that the first pair of planar reflecting portions is tangential to the outer surface of the light source. The second pair of planar reflecting portions is connected at a distal end of the first pair of planar reflecting portions. An opening of the reflector is defined between the distal ends of the second reflecting portions.

14 Claims, 9 Drawing Sheets

REFLECTOR USED IN A STROBE DEVICE

BACKGROUND OF THE INVENTION

The present invention relates to a reflector used in a strobe device.

In a strobe device used in a camera, most of the light is directed towards an object to be photographed. Further, since the field of view of a photographing lens used in the camera is fairly narrow, the strobe device only needs to provide a beam of light which will provide sufficient illumination over the field of view of the photographing lens.

Some strobe devices are provided with reflectors, in order that more of the light emitted by the light source is directed towards the object to be photographed. Therefore, some of the light emitted by the light source is directly incident on the object, while the remaining light is first reflected by the reflector and then incident on the object.

Conventionally, the shape of the reflector is such that a cross section, along an optical axis, of the reflector forms a part of an oval. A strobe having a reflector with this type of cross-section reflects the light rays emitted by the light source to form an image of the light source at a certain point in front of the strobe. However, due to the aberration caused by the reflection surface and a converging lens, which may be provided in the light path, the image may be distorted, resulting in the intensity of the light incident on the object being unevenly distributed.

Further, since a reflector having an oval cross-section is difficult to manufacture accurately, various alternatives such as a reflector having a parabolic or hyperbolic cross section, or a reflector composed of sections joined together (an example of which is shown in Japanese Patent Publication H3-48835), have been proposed. However, it is still difficult to verify that the reflector has the proper shape, if these other constructions are employed. Further, even if the shape is verifiable, a sufficient distribution of the illumination from the strobe device may be difficult to achieve.

SUMMARY OF THE INVENTION

It is therefore an object of the invention to provide an improved reflector for a strobe device which enables even illumination of an object, is easy to manufacture, and is easily mounted in a strobe device.

For the above object, according to one aspect of the present invention, there is provided a reflector used in a strobe device, the strobe device including a light source, and the reflector comprising:

including a rounded reflecting portion, a first pair of planar reflecting portions and a second pair of planar reflecting portions. A shape of the rounded reflecting portion is defined by a portion of a cylinder and the rounded reflecting portion contacts a portion of an outer surface of the light source. The first pair of planar reflecting portions is connected to the rounded reflecting portion, such that the first pair of planar reflecting portions is tangential to the outer surface of the light source, the second pair of planar reflecting portions is connected to the first pair of planar reflecting portions at a distal end thereof, and an opening of the reflector is defined between distal ends of the second planar reflecting portions.

According to another aspect of the present invention, there is provided a reflector used in a strobe device, the strobe device includes a light emitting tube, and the reflector includes an upper and a lower reflection surface arranged above and below a plane which is parallel to a direction in which the light emitting tube is extended. The direction includes an optical axis of the strobe device, and the upper and lower reflection surfaces are symmetrical with respect to the plane.

Each of the upper and lower reflection surfaces includes a rounded reflecting portion, which contacts an outer surface of the light emitting tube.

A first planar reflecting portion, which extends from an end of the curved reflecting portion tangential to the outer surface of the light emitting tube and a second planar reflecting portion, which extends from a distal end of the first planar reflecting portion. The second planar reflecting portion is inclined with respect to the first planar reflecting portion such that the first and second planar reflecting portions are defined by intersecting planes.

An opening of the reflector is defined by an area delimited by distal ends of each of the second planar reflecting portions.

According to a further aspect of the invention, there is provided a strobe device including a light source for emitting rays of light and a reflector for reflecting the rays of light, incident on the reflector, towards a front side of the strobe device, The reflector is formed such that at least four virtual images of the light source are formed behind the reflector, the rays of light virtually radiating from the at least four virtual images.

DESCRIPTION OF THE EMBODIMENTS

Figure 1:
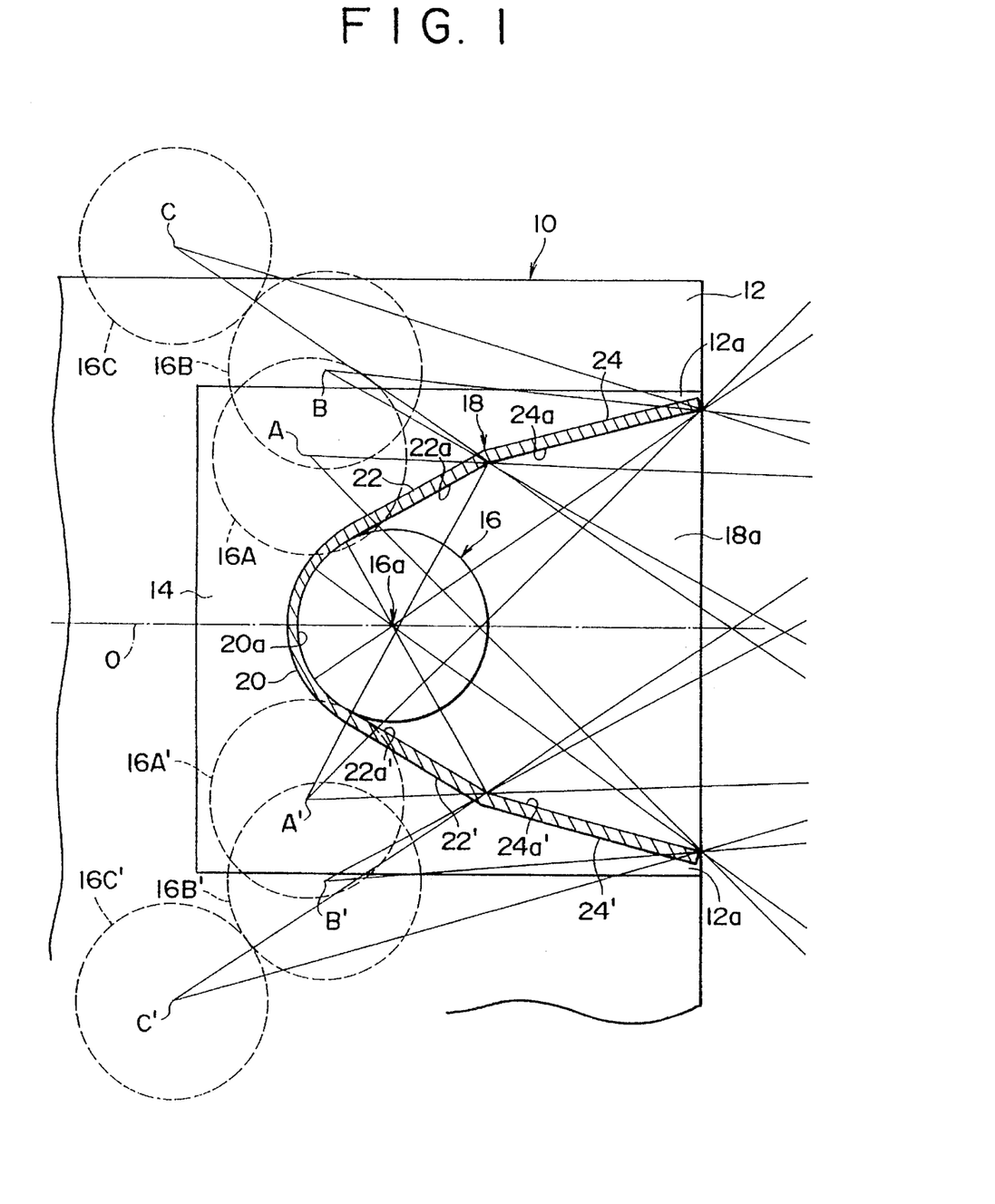
FIG. 1 shows a schematic cross sectional view of a strobe device according to the present invention.

FIG. 1 shows a schematic cross sectional view of a strobe according to the present invention. The strobe 10 has a body 12, a reflector 18, and a light source 16 such as a cylindrical Xenon tube. The body 12 has a chamber 14 which has an opening facing an object, (i.e., towards the right-hand side in the drawing). The light source 16 and the reflector 18 are accommodated in the chamber 14, the exit 18a of the reflector 18 also facing the object. As shown in FIG. 1, the reflector 18 has a rounded V-shape cross section which is symmetrical about an optical axis O. In the actual embodiment, since light source 16 is cylindrical and the reflector 18 surrounds this cylindrical light source, the optical axis O is a portion of an optical axial plane. The optical axial plane is defined as a plane which includes a longitudinal axis of the cylindrical light source 16 and a center line of a plane defining an opening of the reflector, the center line being halfway between the distal ends of the reflector 18.

The reflector 18 comprises a rounded portion 20, having reflection surface 20a; a pair of first straight portions 22, 22', having reflection surfaces 22a, 22a'; and a pair of second straight portion 24, 24', having reflection surfaces 24a, 24a'. contacting a circumferential surface of the light source 16. Reflection surface 20a of the rounded portion 20 contacts the circumferential surface of the light source 16. Light emitted by the light source 16 is reflected by the reflection surfaces 20a, 22a, 22a', 24a and 24a' through opening 18a and a glass plate (not shown) covering opening 12a, towards an object to be illuminated.

Figure 2:
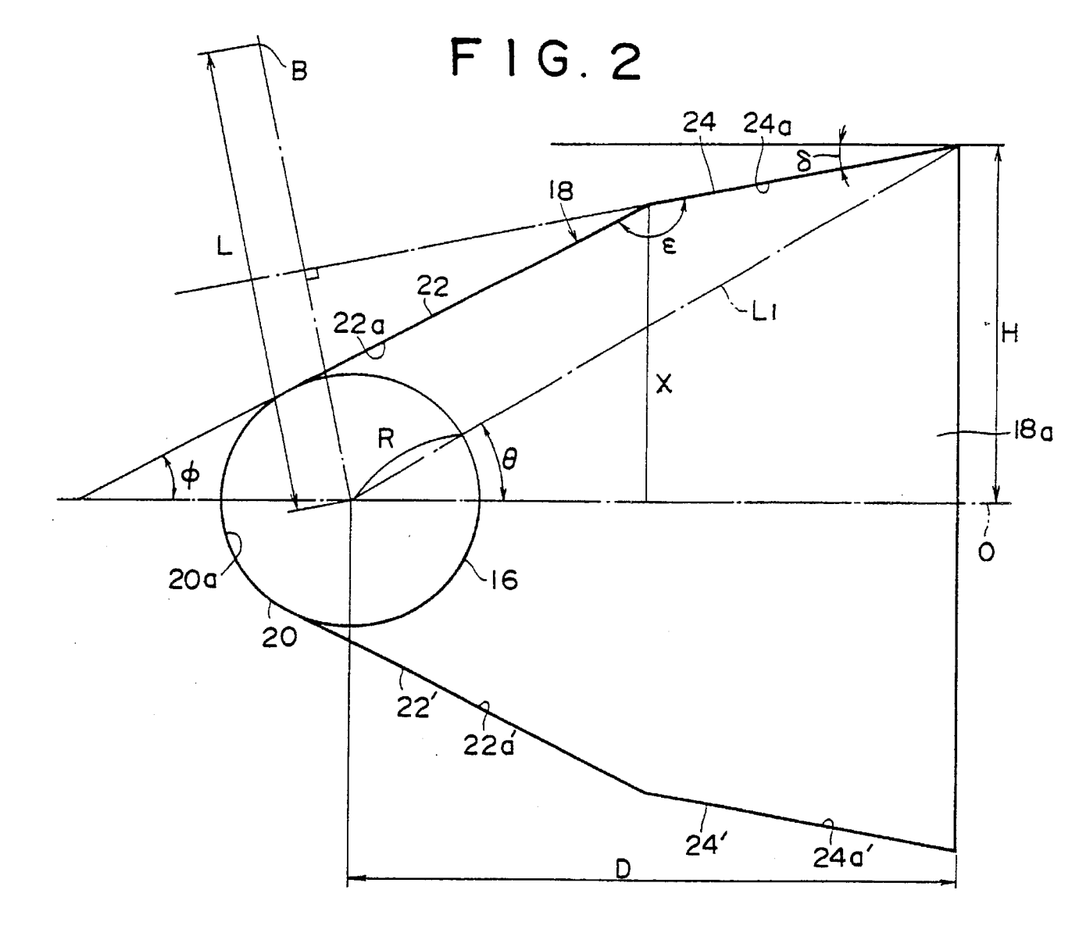
FIG. 2 indicates positional relationships of various surfaces of a reflector used in the strobe device shown in FIG. 1.

As shown in FIG. 2, the reflection surface 22a is tangential to the circumferential surface of the light source 16 (circle 16). The angle formed between the reflection surface 22a and the optical axis O is $\phi$. Further, the angle formed between the reflection surfaces 24a and 22a is $\epsilon$, and the angle formed between a line parallel to the optical axis and the surface 24a is $\delta$. From FIG. 2 it can be seen that the arc which defines the reflection surface 20a is less than 180 degrees. Further, the reflection surface 20a and the circle 16 are concentric circles.

In FIG. 2, the radius of the circle 16 is R, and the distance between reflection surfaces 24a and 24a' is 2H. In the embodiment, $$28° \leq \theta \leq 43°, \text{ and}$$

$$2R \leq D \leq 8R,$$

where, $\theta$ is an angle formed between the optical axis O and a line L1 connecting the center of the circle 16 and the edge of the reflection surfaces 24a, and D is a distance between the center of the circle 16 and a line connecting the edges of the surfaces 24a and 24a'.

Further, $$2.5R \leq L \leq 4.3R,$$

where L is a distance between the center of the circle 16 and point B (described later).

In this embodiment the parameters are set as follows:
R=1.25 mm
2H=5.6 mm
$\theta$=35 degrees.
From the above parameters, D is obtained as follows:

$$D \times \tan 35° = (5.6/2).$$

Therefore,
D=2.8/0.700=4 (mm).
D=3.2R and satisfies the above relation (2R$\leq$D$\leq$8R).
By setting the angles:
$\phi$=29.20°; and
$\delta$=13.68°,
then $\epsilon$=164.48°.
$\epsilon$ is the angle formed between the reflection surfaces 24a and 24a.
Further, L=3.55 mm.
Thus, L=2.84R, and satisfies the above relation (i.e., 2.5R$\leq$L$\leq$4.3R).

From the parameters above, and a distance X (which is the distance between the intersecting point of the surfaces 24a and 24a' and the optical axis O), the shape of the reflector 18 is determined. In the above embodiment, X is set to 2.13 mm.

The resultant illumination pattern of a strobe device employing the reflector 18, will be described below with reference to FIGS. 3, 4 and 5.

Figure 3:
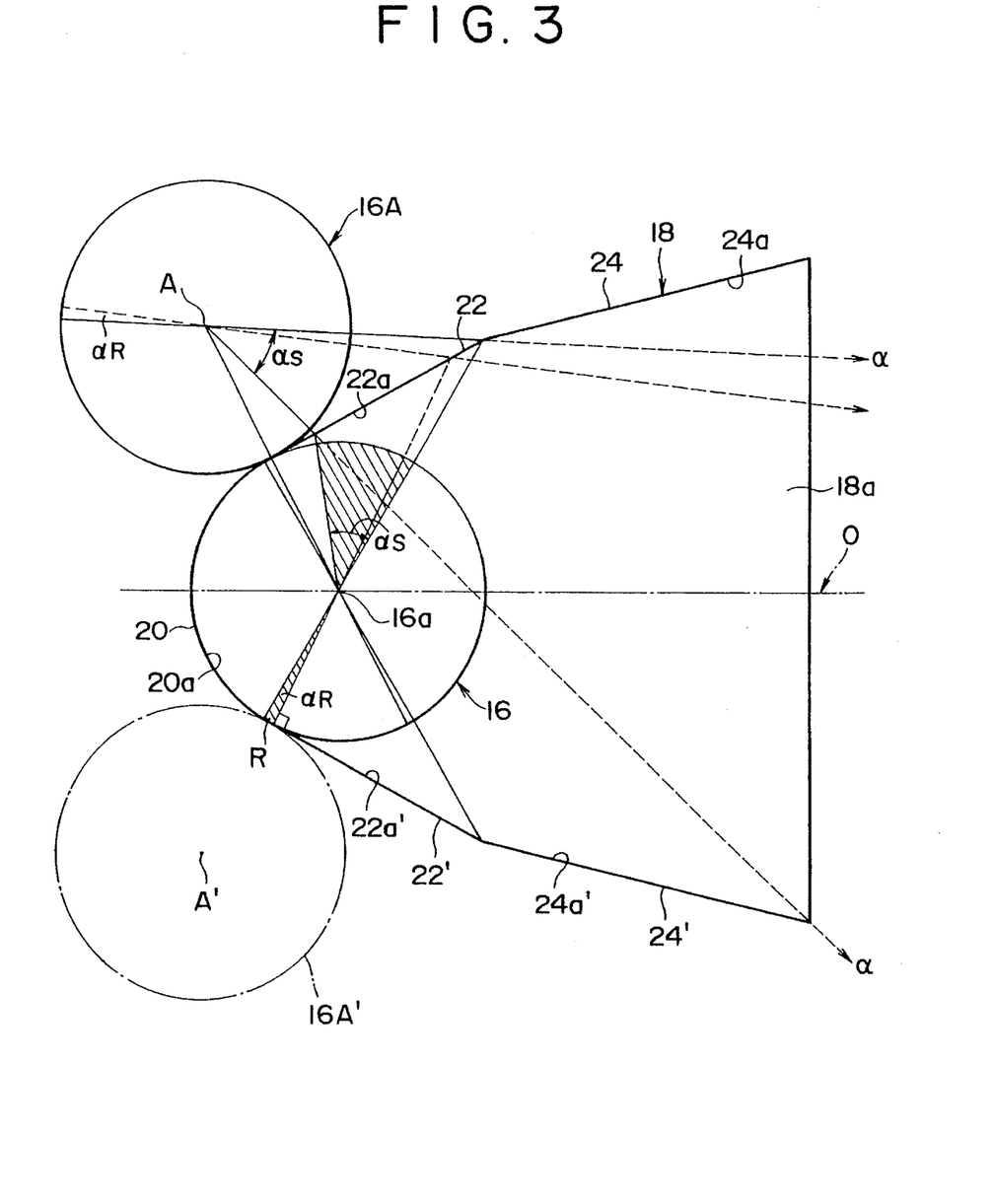
FIG. 3 shows a ray diagram for light reflected by one surface of the reflector shown in FIG. 2.

FIG. 3 shows a path of a ray reflected by the reflection surface 22a. The ray of light emitted from the center of the light source 16 and reflected by the reflection surface 22a follows the path indicated by arrow $\alpha$. Thus the light reflected by the surface 22a is emitted from a light source which appears to be located at point A. Thus, point A is a conjugate point of the center of the light source 16 with respect to the surface 22a. Similarly point A' is a conjugate point of the center of the light source 16 with respect to the surface 22a'. In other words, at points A and A', there are virtual images of the center of the light source 16. The angular range of the ray $\alpha$ emitted from the conjugate point A is indicated as $\alpha$s.

In FIG. 3 $\alpha$R represents the angular range of rays that are first reflected by the reflection surface 20a and then reflected by reflection surface 22a. As shown in FIG. 3, $\alpha$R is a small portion of the range $\alpha$s.

Figure 4:
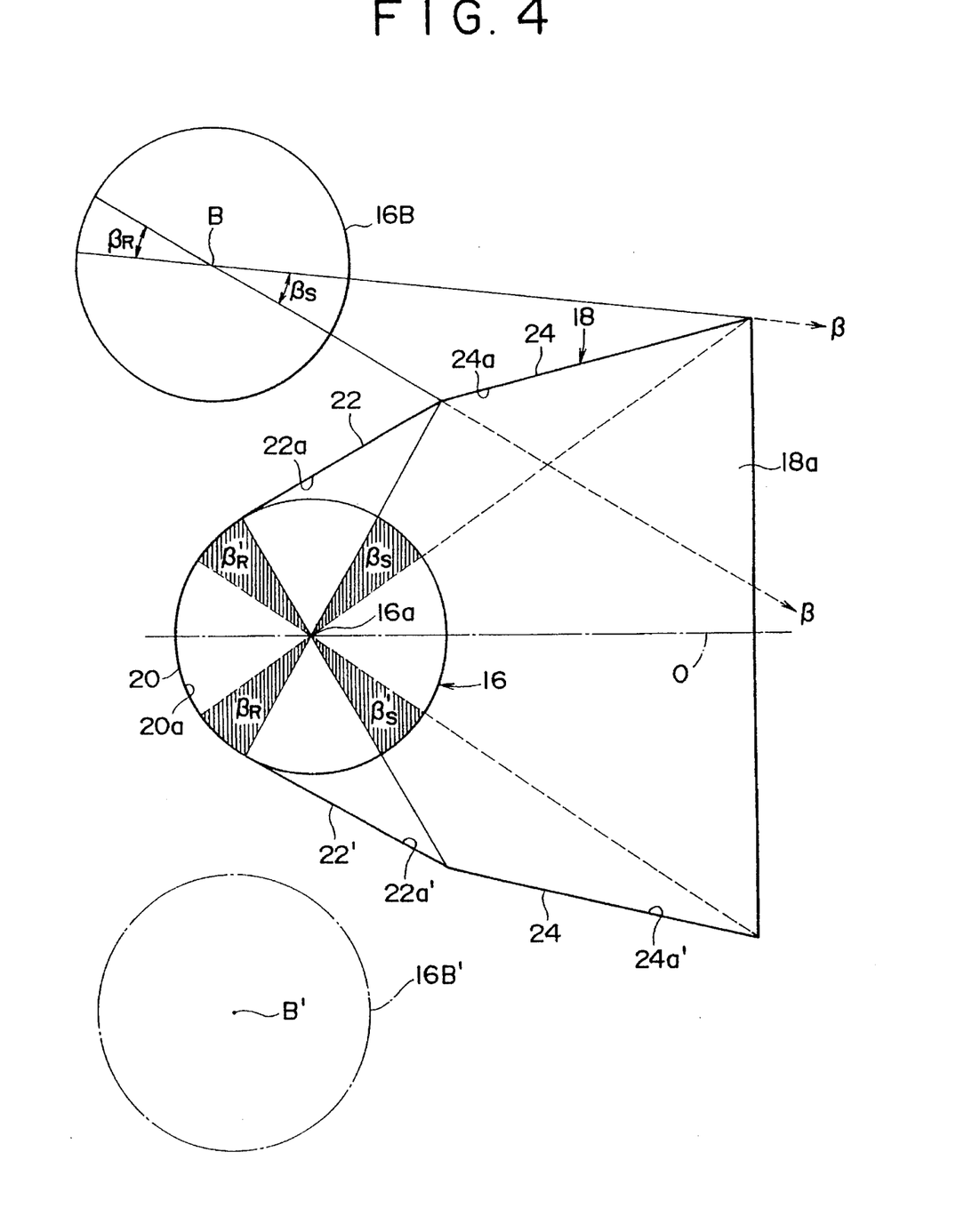
FIG. 4 shows a ray diagram for light reflected by a second surface of the reflector shown in FIG. 2.

FIG. 4 shows a path of a ray reflected by the reflection surface 24a. The ray of light emitted from the center of the light source 16 and reflected by the reflection surface 24a follows the path indicated by arrow $\beta$. Thus the light reflected by the surface 24a is emitted from a light source which appears to be located at point B. Thus, point B is a conjugate point of the center of the light source 16 with respect to the surface 24a. Similarly point B' is a conjugate point of the center of the light source 16 with respect to the surface 24a'. In other words, at points B and B', there are virtual images of the center of the light source 16. The angular range of the ray $\beta$ emitted from the conjugate point B is indicated as $\beta$s.

In FIG. 4, $\beta$R represents the angular range of rays that are first reflected by the reflection surface 20a and then reflected by reflection surface 24a.

Figure 5:
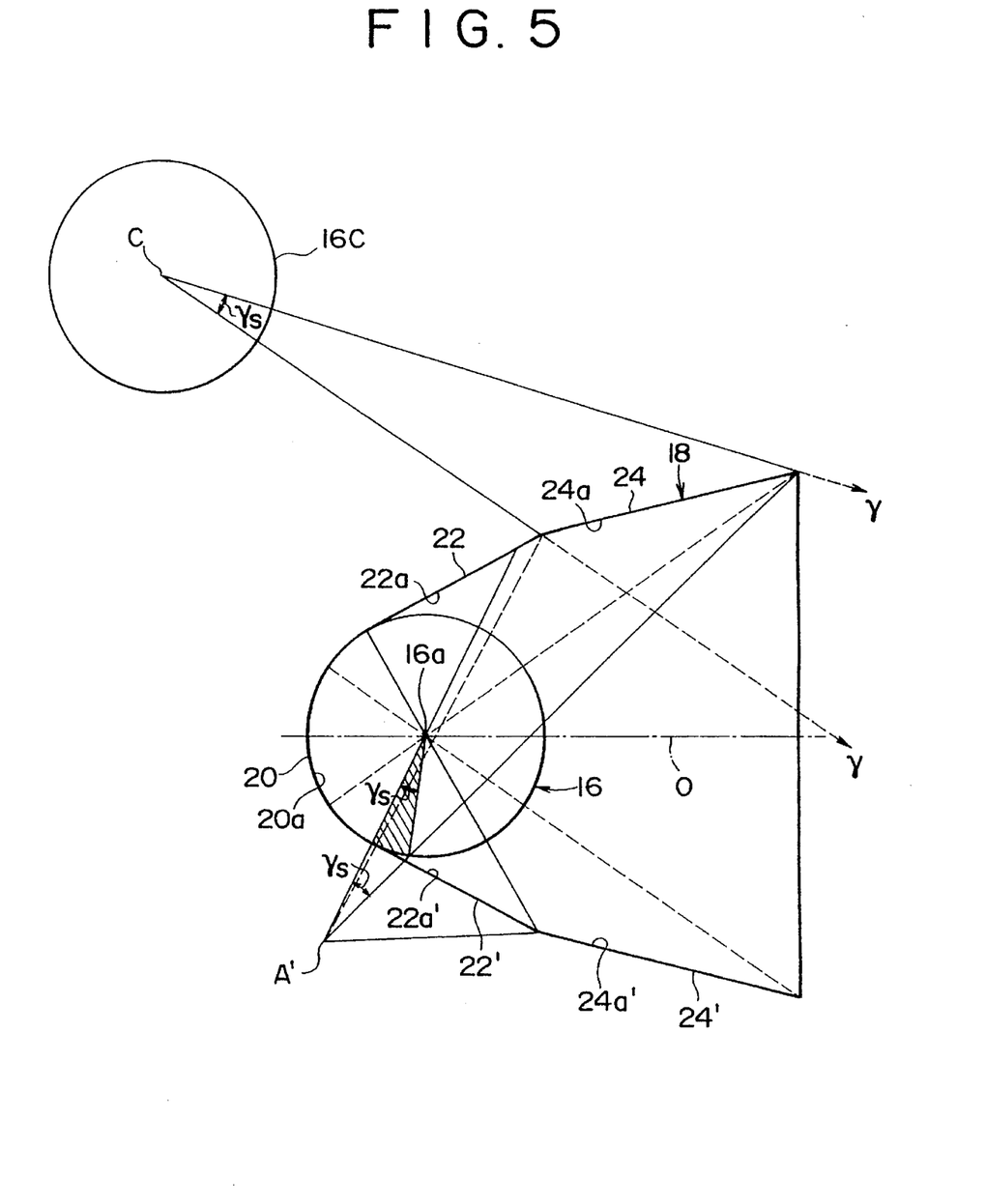
FIG. 5 shows a ray diagram for light reflected by the first surface and reflected by the second surface, of the reflector shown in FIG. 2.

FIG. 5 shows the path of a ray $\gamma$ which is reflected by surface 22a' and then reflected by the surface 24a. The ray $\gamma$ appears as if it is emitted from a light source located at point C, and which is a conjugate point of the light source 16 with respect to the surfaces 24a and 22a'. The angular range of the ray $\gamma$ about point C is indicated as $\gamma$s in FIG. 5.

FIG. 1 shows the six conjugate points A, B, C, A', B' and C', for the light source 16. The light source 16 is represented by six virtual images 16A, 16B, 16C, 16A', 16B' and 16C'. As described above, the virtual images formed at C and C' represent virtual images of the virtual images formed at A and A'. However, depending on the shape of the reflector, the virtual images at C and C' may not be formed. For example, if the length of the surfaces 24a and 24a' from the surfaces 22a, 22a' to the opening of the reflector 18, is reduced, or if the angles formed between the surfaces 22a and 24a, and surfaces 22a' and 24a' are increased, only the four virtual images at A, A', B and B', may be formed.

Figure 6:
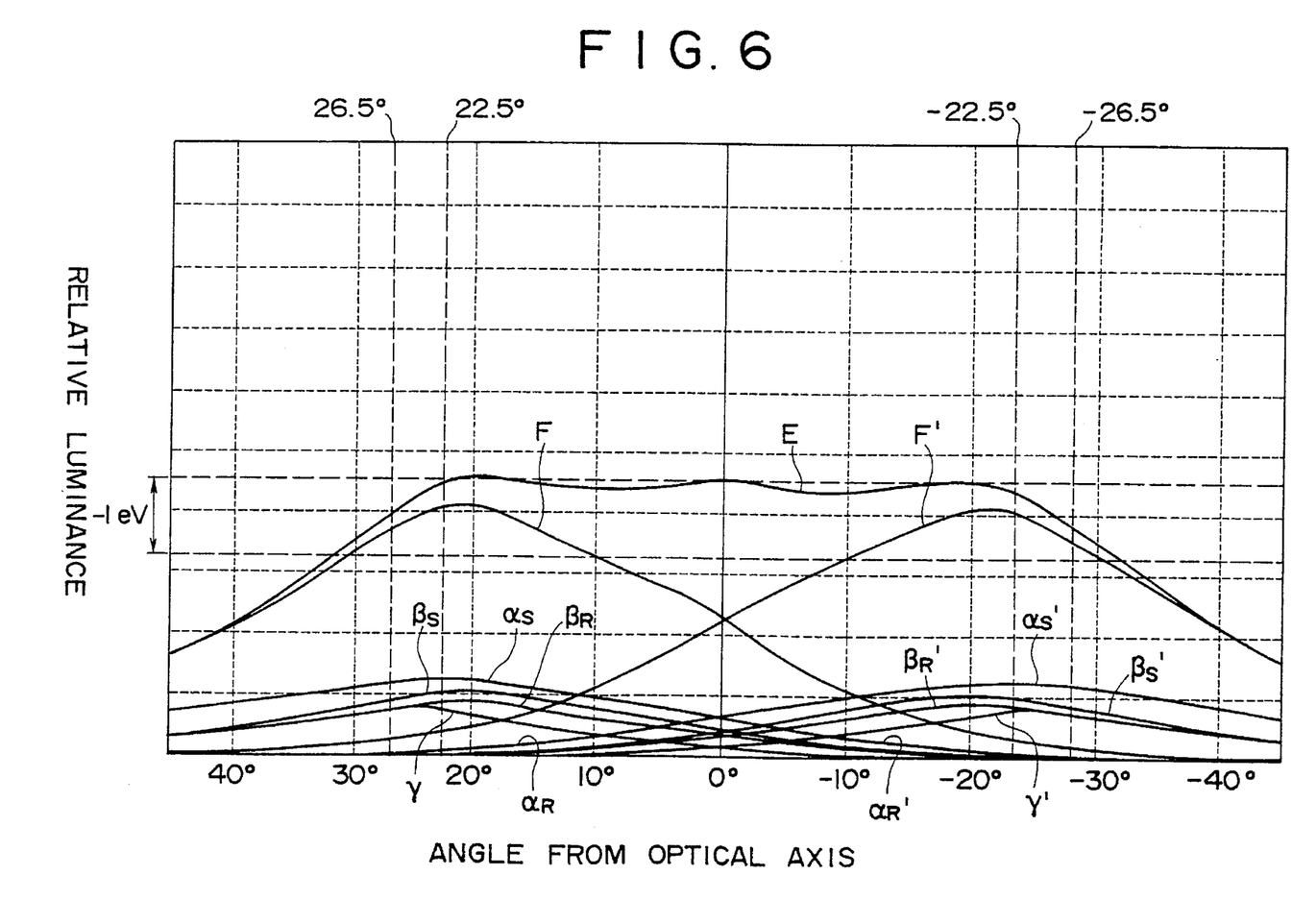
FIG. 6 shows illumination characteristics of the strobe device shown in FIG. 1.

FIG. 6 shows an illumination characteristic of the strobe device which uses reflector 18. In FIG. 6, a curve F shows a characteristic of the upper part of the objective plane, and F' shows the characteristic of the lower part of the objective plane.

In the description, a subscript "s" indicates that the ray is directly reflected by a flat reflection surface, and a subscript R indicates that the ray is first reflected by the curved surface 20a, and then reflected by a flat surface.

The curve F is obtained by combining $\alpha_s$, $\alpha_R$, $\beta_s$, $\beta_R$ and $\gamma$ (which is the same as $\gamma_s$ in this embodiment). The curve F' is obtained by combining $\alpha_s'$, $\alpha_R'$, $\beta_s'$, $\beta_R'$ and $\gamma'$. A curve E is an entire characteristic on the objective plane, which is obtained by combining the curves F and F'.

The strobe device which employs the reflector embodying the present invention, is used with a camera which utilizes standard 35 mm film. Standard 35 mm film has an exposed image frame size of 24 mm by 36 mm. As shown in FIG. 6, a substantially even illumination is obtainable within an angular range of ±22.5° (measured in the same direction as the alignment of the 24 mm dimension of the film frame), which corresponds to the frame zone of a 35 mm photographing lens. Even in an angular range of ±26.5°, which corresponds to the frame zone of a 28 mm photographing lens, the decrease in the relative brightness level is less than −1 (eV).

According to the above description, a reflector used in a strobe device which has an even illumination characteristic over a desired angular range, can be easily manufactured, since the reflector comprises a curved portion, which is formed from a cylindrical surface, and two straight portions which are formed from planar surfaces.

Therefore the manufacturing of the reflector is uncomplicated, and the verification of the shape of the reflector is easy to confirm. Further, since the reflector comprises planar surfaces it is easy to mount to the body of the strobe device.

Since the second straight portion 24 (24') are bent towards the optical axis O, and the distance D is set to satisfy the above-described limitation, the size of the reflector can be made small.

Figure 7:
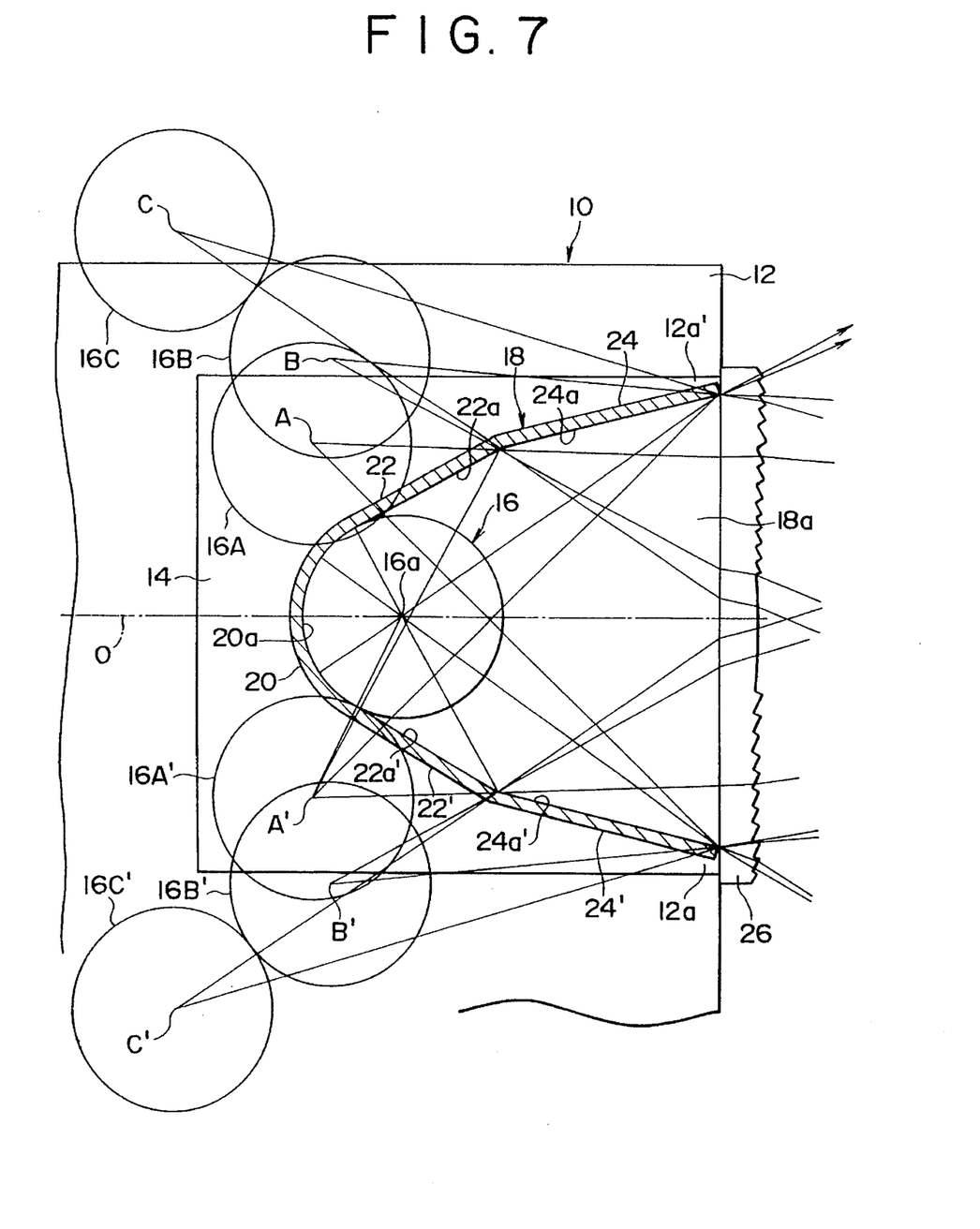
FIG. 7 shows a schematic cross sectional view of a strobe device according to a second embodiment of the present invention.

FIG. 7 shows a second embodiment of the present invention. This embodiment is similar to the first embodiment described above. The elements common to both embodiments have common reference numerals and will not be described below.

In the second embodiment, the glass plate of the first embodiment which covers the opening 12a is replaced with a Fresnel lens 26. Since the cross section of the reflector 18 does not have an oval shape, no image is formed in front of the reflector 18. Thus, by placing the Fresnel lens 26 in front of the opening 12a, the illumination angle zone of the strobe can be adjusted. The Fresnel lens 26 has a inner surface facing the chamber 14 and an outer surface. The inner surface is a planar surface, and the outer surface is a convex surface, the radius of which is −18 mm. The refractive index n is 1.49 (for light having a wavelength of 587.56 nm, i.e., a d line), and the maximum thickness of the Fresnel lens 26 is 1.5 mm.

In this second embodiment, if the illuminating angle range of the strobe 12 without the Fresnel lens 26 is set to 35°, the actual illuminating angle range with the Fresnel lens is about 29°, which corresponds to the frame zone of the 28 mm lens.

Figure 8:
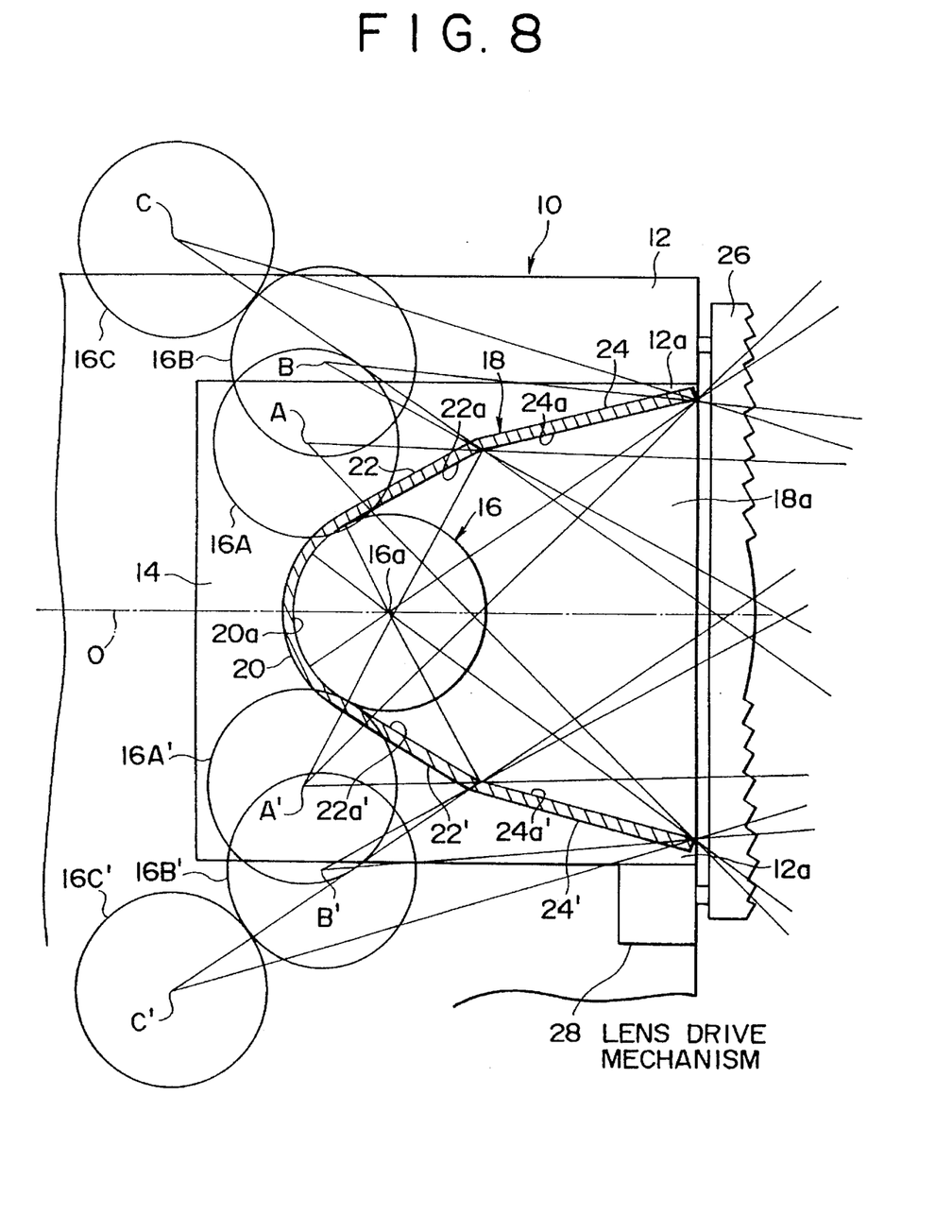
FIG. 8 shows a schematic cross sectional view of a strobe device according to a third embodiment of the present invention, arranged to illuminate a wide objective plane.
Figure 9:
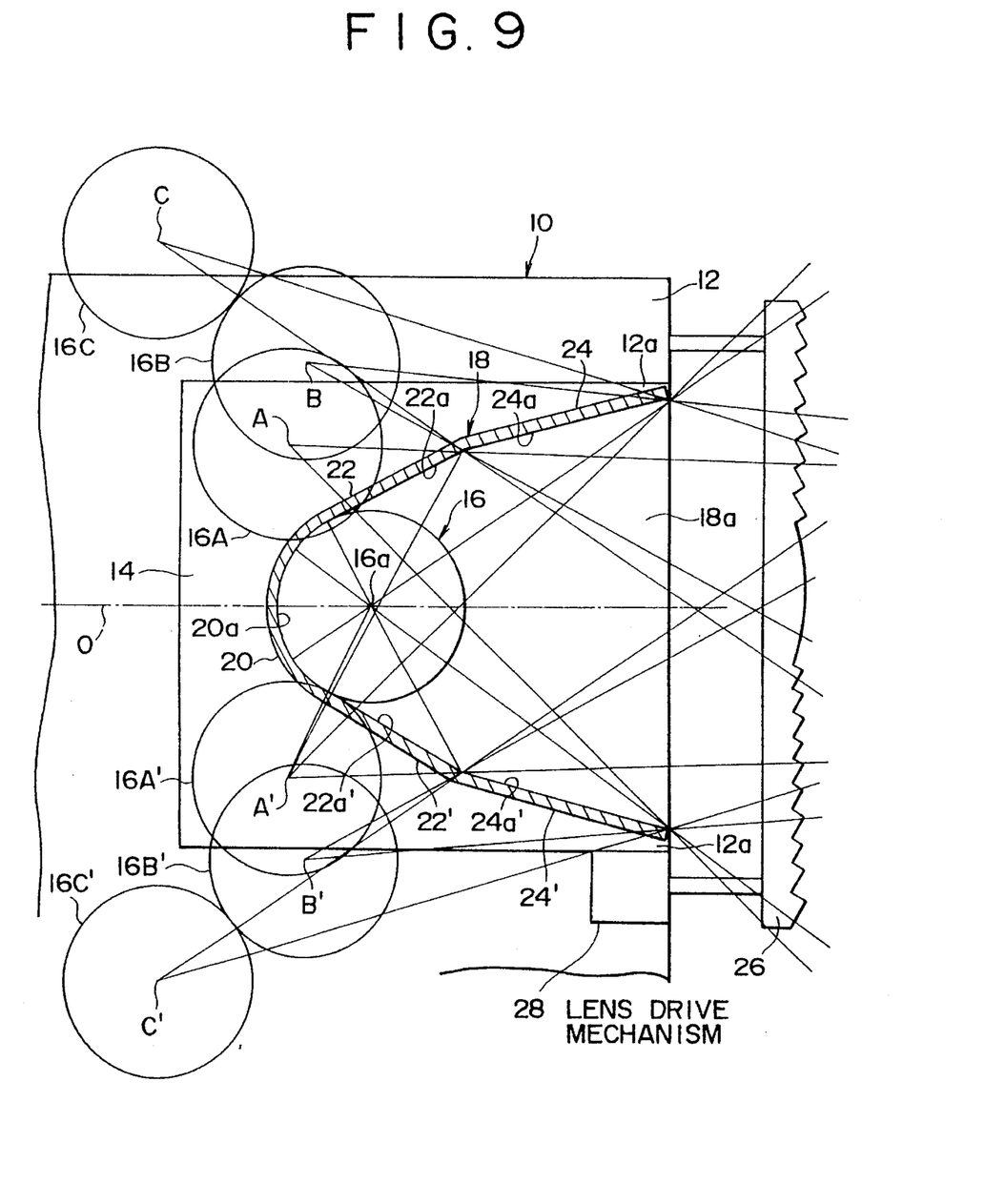
FIG. 9 shows the strobe device of FIG. 8, arranged to illuminate a narrow objective plane.

FIGS. 8 and 9 show a third embodiment. The third embodiment is similar to the second embodiment described above. The elements common to both embodiments have common reference numerals and will not be described below.

The third embodiment is provided with a lens drive mechanism 28 for moving the Fresnel lens 26 along the optical axis O. This allows the illuminating angle range of the strobe device 10 to be changed. By synchronizing the lens drive mechanism 28 with a drive mechanism of a zoom lens, it is possible to have the illumination angle range of the strobe device 10 correspond to the frame size of the zoom lens, for every focal length of the zoom lens.

In the third embodiment, the illuminating angle zone of the strobe 10 without the Fresnel lens 26 corresponds to the frame zone of a 28 mm photographing lens (using standard 35 mm film). If the distance between the center of the light source 16 and the Fresnel lens 26 is 5.8 mm as shown in FIG. 8, then the illumination angle range corresponds to the frame size of a 35 mm photographing lens. If the distance between the center of the light source 16 and the Fresnel lens 26 is 12 mm as shown in FIG. 9, then the illumination angle range corresponds to the frame size of a 70 mm photographing lens.

As described above, according to the present invention, the reflector of the strobe device can be easily mounted on the body of the strobe device. Further, the shape of the reflector can be manufactured accurately, and the manufactured shape can be confirmed easily. Furthermore, the size of the reflector can be made relatively small, thereby reducing the size of the strobe device.

The present disclosure relates to subject matter contained in Japanese Patent Application No. HEI 5-226419, filed on Aug. 19, 1993, which is expressly incorporated herein in its entirety.

What is claimed is:

1. A reflector used in a strobe device, said strobe device comprising a light source, and said reflector comprising:

a rounded reflecting portion;

a first pair of planar reflecting portions; and a second pair of planar reflecting portions, wherein a shape of said rounded reflecting portion is defined by a portion of a cylinder, said rounded reflecting portion contacting a portion of an outer surface of said light source, wherein said first pair of planar reflecting portions is connected to said rounded reflecting portion, such that said first pair of planar reflecting portions is tangential to said outer surface of said light source, and wherein said second pair of planar reflecting portions is connected to said first pair of planar reflecting portions at a distal end thereof, an opening of said reflector defined between distal ends of said second planar reflecting portions.

2. The reflector according to claim 1, wherein a distance D measured from a center of said light source to said opening of said reflector satisfies the condition:

$$2R \leq D \leq 8R,$$

where, R is a radius of said light source, and wherein a light distribution angle $\theta$ satisfies the condition:

$$28° \leq \theta \leq 43°,$$

wherein, $\theta = \tan^{-1}(H/D)$; and

H is half of a height of said opening of said reflector between said distal ends of said second reflecting portions.

3. The reflector according to claim 2, wherein said light source and said second planar reflecting portion form a virtual image a distance L from said center of said light source, wherein said distance L satisfies the following condition:

$$2.5R \leq L \leq 4.3R.$$

4. The reflector according to claim 1, wherein said opening contacts a Fresnel lens.

5. The reflector according to claim 4, wherein a distance of said Fresnel lens from a center of said light source can be varied, in order to vary an angle of dispersion of light emitted by said light source.

6. A reflector used in a strobe device, said strobe device comprising a light emitting tube, and said reflector comprising an upper and a lower reflection surface arranged above and below a plane which is parallel to a direction in which said light emitting tube is extended, said direction including an optical axis of said strobe device, said upper and lower reflection surfaces being symmetrical with respect to said plane, wherein each of said upper and lower reflection surfaces comprises:

a rounded reflecting portion, which contacts an outer surface of said light emitting tube;

a first planar reflecting portion, said first planar reflecting portion extending from an end of said rounded reflecting portion, and tangential to said outer surface of said light emitting tube; and a second planar reflecting portion, said second planar reflecting portion extending from a distal end of said first planar reflecting portion, said second planar reflecting portion inclined with respect to said first planar reflecting portion such that said first and second planar reflecting portions are defined by intersecting planes, and wherein an opening of said reflector is defined by an area delimited by distal ends of each of said second planar reflecting portions.

7. The reflector according to claim 6, wherein a distance D measured from a center of said light emitting tube to said opening of said reflector satisfies the condition:

$2R \leq D \leq 8R$, where, R is a radius of said light emitting tube, and wherein a light distribution angle θ satisfies the condition:

$28° \leq \theta \leq 43°$, wherein, $\theta = \tan^{-1}(H/D)$; and
H is half of a height of said opening of said reflector between said distal ends of said second planar reflecting portions.

8. The reflector according to claim 7, wherein said light emitting tube and said second planar reflecting portion form a virtual image a distance L from said center of said light emitting tube, wherein said distance L satisfies the following condition:

$2.5R \leq L \leq 4.3R$.

9. The reflector according to claim 6, wherein said opening contacts a Fresnel lens.

10. The reflector according to claim 9, wherein a distance of said Fresnel lens from a center of said light emitting tube can be varied, to vary an angle of dispersion of light emitted by said light emitting tube.

11. A strobe device, comprising:

a single light source that emits rays of light; and a reflector, symmetrically positioned about said single light source, said reflector reflecting said rays of light incident on said reflector towards a front side of said strobe device, wherein said reflector is formed such that all virtual images of said single light source are formed behind said reflector, said rays of light virtually radiating from said virtual image, and at least four virtual images are formed, such that a light intensity of said rays virtually radiated from said at least four virtual images, are substantially evenly distributed within a predetermined angular zone.

12. The strobe device according to claim 11, wherein at least four virtual images are formed at different positions behind said reflector.

13. The strobe device according to claim 11, wherein said light source has a tubular surface from which said rays of light are emitted, said rays of light being emitted in all directions.

14. The strobe device according to claim 11, wherein said reflector is formed such that six virtual images are formed.

* * * * *

UNITED STATES PATENT AND TRADEMARK OFFICE
CERTIFICATE OF CORRECTION

PATENT NO. : 5,584,572
DATED : December 17, 1996
INVENTOR(S) : Tsuyoshi ISHIKAWA It is certified that error appears in the above-indentified patent and that said Letters Patent is hereby corrected as shown below:

At column 7, line 37 (claim 7, line 7), change "$\theta$43°" to ---$\theta \leq 43°$---.

At column 8, line 13 (claim 10, line 3), change "varied, to" to ---varied to---.

Signed and Sealed this

Eighteenth Day of March, 1997

BRUCE LEHMAN

Attest:

Attesting Officer

Commissioner of Patents and Trademarks